United States Patent
Sugitani et al.

(10) Patent No.: US 8,063,868 B2
(45) Date of Patent: Nov. 22, 2011

(54) DISPLAY DEVICE

(75) Inventors: Choei Sugitani, Kanagawa (JP);
Kazuaki Mikami, Kanagawa (JP)

(73) Assignee: NEC Corporation, Tokyo (JP)

( * ) Notice: Subject to any disclaimer, the term of this patent is extended or adjusted under 35 U.S.C. 154(b) by 876 days.

(21) Appl. No.: 11/172,790

(22) Filed: Jul. 5, 2005

(65) Prior Publication Data

US 2007/0008275 A1    Jan. 11, 2007

(30) Foreign Application Priority Data

Jul. 5, 2004   (JP) .................... 2004-198115

(51) Int. Cl.
*G09G 3/36* (2006.01)
(52) U.S. Cl. ........................................ 345/102
(58) Field of Classification Search .............. 345/76–83, 345/87–102, 204; 362/632, 615; 315/169.1–169.4
See application file for complete search history.

(56) References Cited

U.S. PATENT DOCUMENTS

| | | | |
|---|---|---|---|
| 5,857,767 A | 1/1999 | Hochstein | |
| 6,244,331 B1 * | 6/2001 | Budelman | 165/80.3 |
| 6,574,030 B1 * | 6/2003 | Mosier | 359/267 |
| 6,667,567 B2 * | 12/2003 | Fujishiro | 313/46 |
| 6,789,921 B1 * | 9/2004 | Deloy et al. | 362/97.3 |
| 7,025,474 B2 | 4/2006 | Campbell et al. | 362/231 |
| 7,322,732 B2 * | 1/2008 | Negley et al. | 362/612 |
| 7,455,425 B2 | 11/2008 | Inoue et al. | |
| 2002/0005826 A1 * | 1/2002 | Pederson | 345/82 |
| 2003/0123008 A1 * | 7/2003 | Liao | 349/141 |
| 2003/0214242 A1 * | 11/2003 | Berg-johansen | 315/169.3 |
| 2004/0165124 A1 * | 8/2004 | Yu et al. | 349/61 |
| 2006/0139952 A1 | 6/2006 | Inoue et al. | |

FOREIGN PATENT DOCUMENTS

| | | |
|---|---|---|
| CN | 2585273 | 11/2003 |
| JP | 63-020128 | 2/1988 |
| JP | 5-081874 | 11/1993 |
| JP | 6-18916 | 1/1994 |
| JP | 08-016114 | 1/1996 |
| JP | 10-082916 | 3/1998 |
| JP | 11-52369 | 2/1999 |
| JP | 11-064849 | 3/1999 |
| JP | 2001-265235 | 9/2001 |
| JP | 2002-311417 | 10/2002 |
| JP | 2003-331604 | 11/2003 |

(Continued)

OTHER PUBLICATIONS

High-efficiency slim LED backlight system with mixing light guide—Yourii Martynov, Huub Konijn, Simon Kuppens and Wim Timmers Lumileds Lighting, De Rijn 2, 5680 AK Best, The Netherlands Philips CFT, Glaslaan 2, Eindhoven, the Netherlands.
Japanese Patent Office issued a Japanese Office Action dated May 7, 2009, Application No. 2004-198115.

(Continued)

*Primary Examiner* — Stephen Sherman
(74) *Attorney, Agent, or Firm* — Young & Thompson

(57) ABSTRACT

A heatsink made of aluminum is provided in a liquid crystal display device. A plurality of light emitting diodes are contacted to a front surface of the heatsink. A fin unit is contacted to a rear surface of the heatsink. In addition, a display panel is supported by a holding member so as to be positioned at a constant distance from the light emitting diodes. The holding member is composed of a front cover and a rear cover of the display panel, supported by the heatsink and a chassis provided between the display panel and the rear cover.

8 Claims, 4 Drawing Sheets

FOREIGN PATENT DOCUMENTS

| | | |
|---|---|---|
| JP | 2004-021104 | 1/2004 |
| JP | 2004-029370 | 1/2004 |
| JP | 2004-118205 | 4/2004 |
| JP | 2004-158224 | 6/2004 |
| JP | 2004-158336 | 6/2004 |
| JP | 2004-171947 | 6/2004 |
| JP | 2004-265626 | 9/2004 |
| WO | 2004/038283 | 5/2004 |

OTHER PUBLICATIONS

Taiwanese Patent Office issued a Taiwanese Office Action dated, Aug. 18, 2009, Application No. 094122549.

Japanese Patent Office issued a Japanese Office Action dated Apr. 27, 2010, Application No. 2004-198115.

Taiwanese Patent Office issued a combined Office Action and Search Report dated Apr. 14, 2009, Application No. 094122549.

* cited by examiner

DISPLAY DEVICE

BACKGROUND OF THE INVENTION

1. Field of the Invention

The present invention relates to a display device using light emitting diode (LED) as a light source.

2. Description of the Related Art

For example, as disclosed in Japanese Patent Publication No. 2002-311417, priorly, cold cathode tubes have been used for light sources of liquid crystal display devices. As the light sources of liquid crystal display devices using cold cathode tubes, direct backlights and side backlights can be mentioned. And, in a liquid crystal display device with a built-in direct backlight, cold cathode tubes have been arranged on the rear surface-side of a liquid crystal panel, and a white light emitted from these cold cathode tubes passes through the liquid crystal panel, whereby an image is displayed. In addition, in a liquid crystal display device with a built-in side backlight, cold cathode tubes have been arranged at lateral sides on the rear surface-side of a liquid crystal panel, and a white light emitted from these cold cathode tubes is supplied to the entire surface of the liquid crystal panel by a light-guide plate, and this light passes through the liquid crystal panel, whereby an image is displayed.

In contrast thereto, recently, for example, as described in Japanese Patent Publication No. H04-118205, literature (Yourii Martynov et al., "High-efficiency slim LED backlight system with mixing light guide," SID 03 DIGEST 43.3/Martynov, [on line], <URL: http://www.lumileds.com/pdfs/LEDBacklightMixingLightguideSID.PDF> [searched on Jun. 21, 2004]), and literature (Nikkei Electronics Jun. 21, 2004 Issue, pp. 60-61), in order to improve color reproducibility of images, a technique using red light emitting diodes, green light emitting diodes, and blue light emitting diodes as a light source has been developed. This technique is for arranging red light emitting diodes, green light emitting diodes, and blue light emitting diodes in line on the rear surface-side of a liquid crystal panel, mixing lights from these by a light guide, and irradiating the same as a white light onto a liquid crystal panel.

However, the aforementioned conventional technique has problems as shown in the following. Although light emitting diodes are more favorable in color reproducibility than cold cathode tubes, the light emitting diodes consume greater electricity than the cold cathode tubes, and the calorific value is also greater. Therefore, the light emitting diodes are raised in temperature by heat generated on their own. And, when the temperature is raised, the light emitting diodes are lowered in luminous efficiency. In addition, when the temperature of the light emitting diodes is excessively raised, the light emitting diodes themselves are destroyed.

SUMMARY OF THE INVENTION

It is an object of the present invention to provide a display device using light emitting diode as a light source, in which a rise in temperature of light emitting diodes has been suppressed.

A display device according to the present invention comprises: a light emitting diode; a display panel which displays an image by light emitted from the light emitting diode; a heatsink contacted to the light emitting diodes; and a holding member which is supported by the heatsink and holds the display panel so as to position the display panel and the light emitting diode at a constant distance therebetween.

In the present invention, since light emitting diode is used as a light source, color reproducibility of an image is excellent. In addition, since the light emitting diode is contacted to the heatsink, heat generated by the light emitting diode can be efficiently released, and a rise in temperature of the light emitting diode can be suppressed.

In addition, in order to obtain sufficient heat-radiation performance, it is necessary to increase the heatsink in size, however, the heatsink becomes heavy when the heatsink is increased in size, and the display device becomes structurally unstable. In contrast thereto, in the present invention, the heatsink also functions as a supporting substrate of a display panel, this is, the heatsink supports a holding member, and the holding member supports the display panel. Thereby, the liquid crystal display device never loses mass balance as a whole even when the heatsink is increased in size, and the display device is structurally stabilized.

In addition, it is preferable that the heatsink is arranged parallel to the display panel. Thereby, without increasing the display device in size, the outline of the heatsink can be increased to the same degree as that of the liquid crystal panel. As a result, heat-radiation performance is improved, and also the display panel can be stably supported.

Furthermore, it is preferable that the heatsink comprises a part for connecting an external chassis. Thereby, even when the mass of the heatsink is increased to improve heat-radiation performance, so that the center of gravity of the display device is positioned within the heatsink, since the external chassis supports the heatsink, the display device is dynamically stabilized. At this time, it is preferable that the part is a screw hole provided at side surface of the heatsink, the heatsink is fixed to the external chassis by screwing a screw of the external chassis into the screw hole. Thereby, without providing a special connecting member, the heatsink can be connected to the external chassis. Still, the external chassis is for supporting the whole display device.

Still furthermore, it is preferable that the heatsink is made of aluminum or an aluminum alloy. Thereby, thermal conductivity of the heatsink can be improved, and also the heat sink can be lightened in weight.

Still furthermore, it is preferable that fin is attached to the heatsink. Thereby, heat-radiation performance is further improved.

Still furthermore, it is preferable that the light emitting diode is provided in a plurality of numbers, some of these plurality of light emitting diodes are red light emitting diodes to emit red light, some of the others are green light emitting diodes to emit green light, and the rests are blue light emitting diodes to emit blue light, and the display device comprises an optical unit for mixing lights emitted from the red diodes, green diodes, and blue diodes and guiding the same to the display panel. Thereby, a white and highly color-reproducible light can be uniformly irradiated onto the display panel.

At this time, it may be possible that the plurality of light emitting diodes are arrayed in line, and the optical unit comprises: a color-mixing light guide plate for mixing light emitted from the red diodes, green diodes, and blue diodes; a reflector for folding back light emitted from the color-mixing light guide plate; and an illuminating light guide plate arranged between the color-mixing light guide plate and the display panel for emitting light made incident from the reflector to the whole surface of the display panel. Thereby, the display device can be lowered in profile.

And, it is preferable that the holding member comprises: a front cover covering peripheral portions of the display panel; a chassis for sandwiching the display panel between the same and this front cover and housing the illuminating light guide plate and the color-mixing light guide plate; and a rear cover for sandwiching the illuminating light guide plate and the color-mixing light guide plate between the same and the chassis, and the front cover and the rear covers are connected to the heatsink. Thereby, the display panel can be connected to the heatsink by a simple construction.

Alternatively, it may be possible that the plurality of light emitting diodes are arrayed in a matrix form at positions opposed to the display panel, and the optical unit comprises a diffusion plate for diffusing and transmitting lights emitted from the red diodes, green diodes, and blue diodes.

According to the present invention, since light emitting diode is used as a light source, color reproducibility of an image is excellent, and since the light emitting diodes are connected to a heatsink, a rise in temperature of the light emitting diodes can be suppressed, and since a holding member to hold the display panel is connected to the heatsink, the display device never loses mass balance as a whole even when the heatsink is increased in size, thus the display device is structurally stabilized

DETAILED DESCRIPTION OF THE PREFERRED EMBODIMENTS

Figure 1:
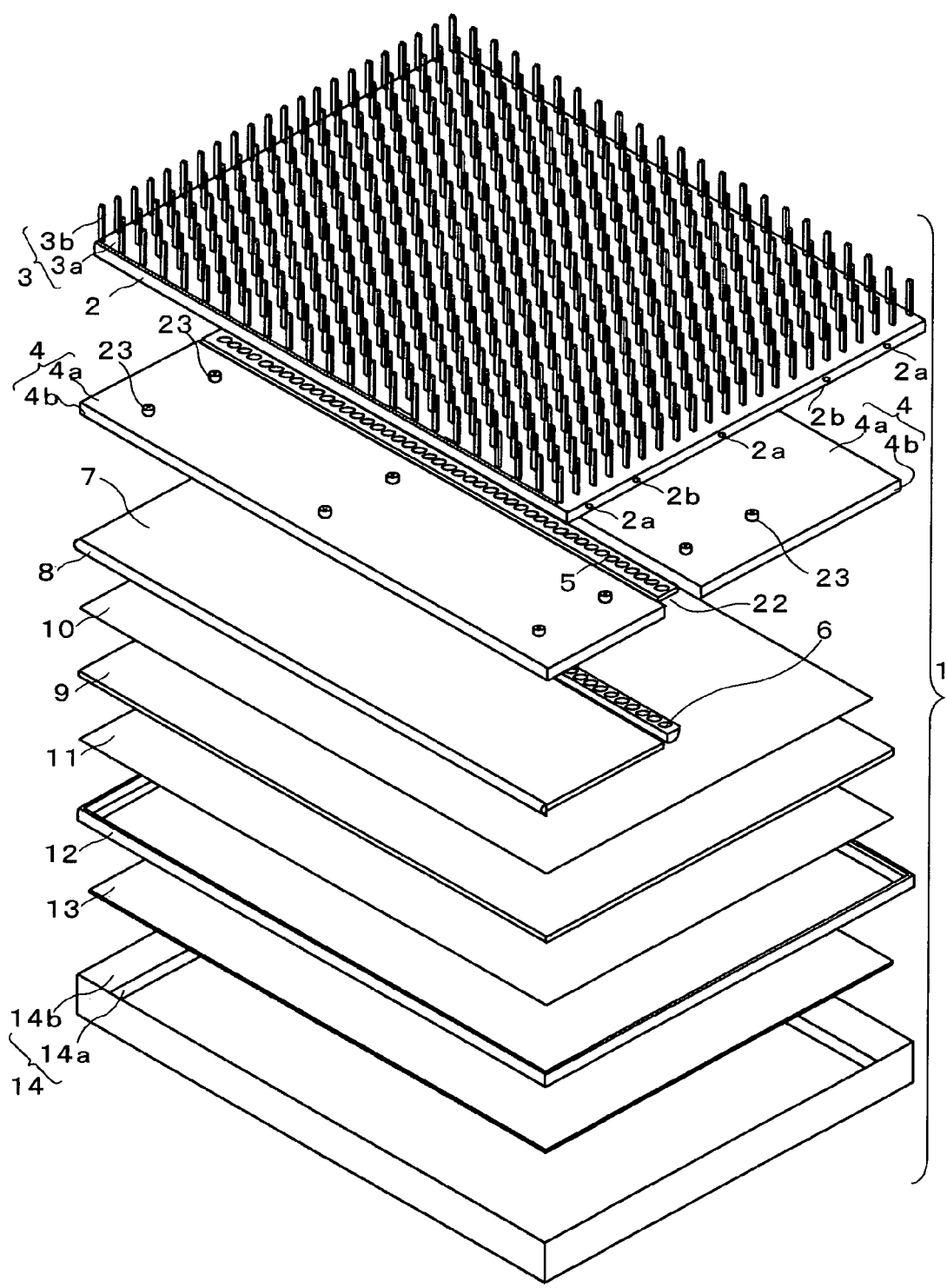
FIG. 1 is an exploded perspective view showing a liquid crystal display device according to a first embodiment of the invention.
Figure 2:
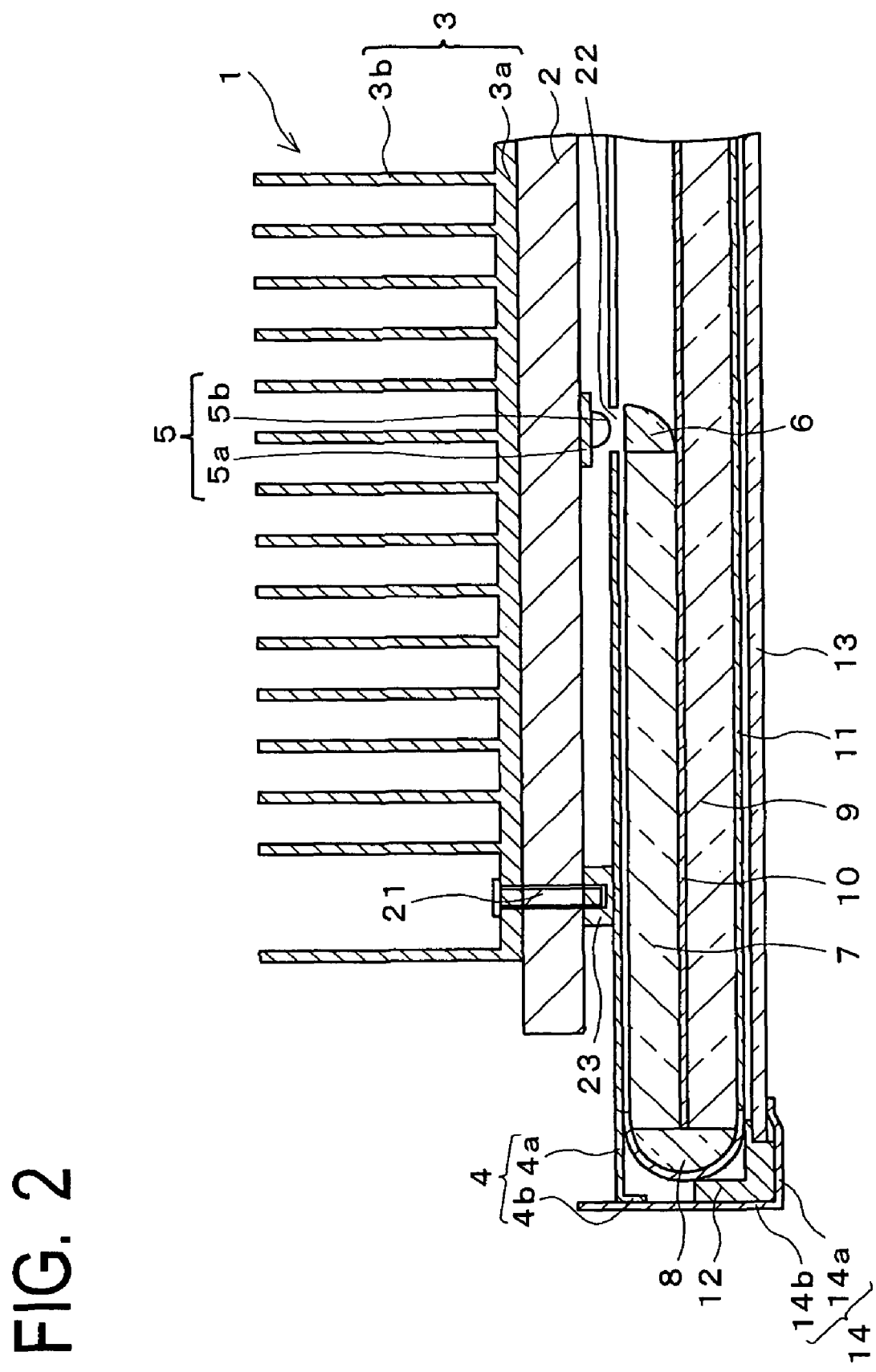
FIG. 2 is a partial sectional view showing a section orthogonal to an array direction of light emitting diodes of this liquid crystal display device.
Figure 3:
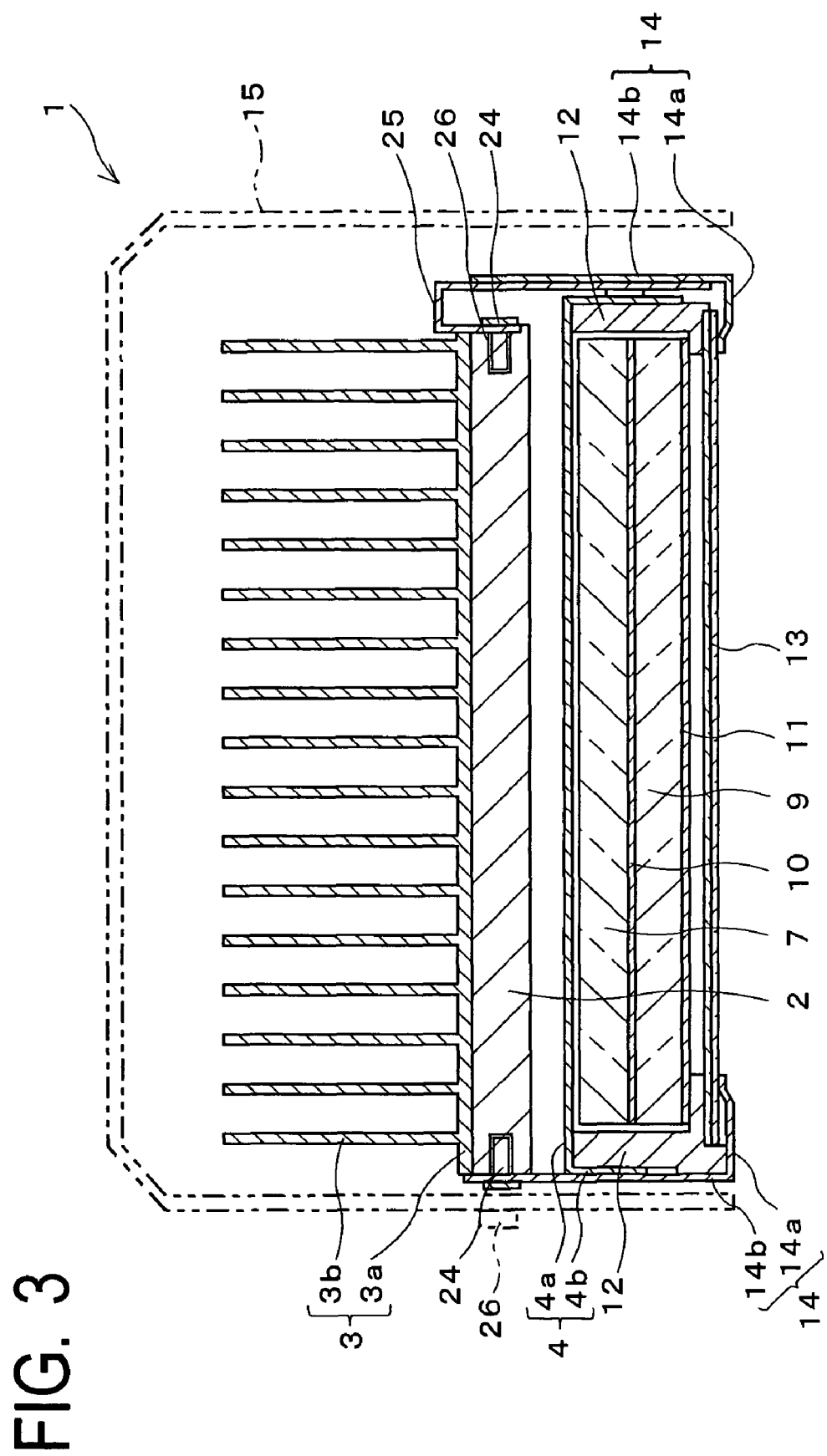
FIG. 3 is a sectional view showing a section parallel to an array direction of light emitting diodes of this liquid crystal display device.

Hereinafter, embodiments of the present invention will be described in detail with reference to the attached drawings. First, description will be given of a first embodiment of the present invention. FIG. 1 is an exploded perspective view showing a liquid crystal display device according to the present embodiment, FIG. 2 is a partial sectional view showing a section orthogonal to an array direction of light emitting diodes of this liquid crystal display device, and FIG. 3 is a sectional view showing a section parallel to an array direction of light emitting diodes of this liquid crystal display device. Still, in the present specification, of directions vertical to a display surface of the liquid crystal display device, a direction which is at the viewer side when viewed from the liquid crystal display device is referred to as a front side and a direction opposite thereto is referred to as a rear side. In addition, directions orthogonal to the front and rear sides are referred to as lateral sides. A liquid crystal display device 1 according to the present embodiment is, for example, a professional-use monitor used mainly by professional printers or photographers.

As shown in FIG. 1 through FIG. 3, in the liquid crystal display device 1 according to the present embodiment, a heatsink 2 is provided. The heatsink 2 is a plate member made of, for example, aluminum, which has been shaped by a cutout method. Since the heatsink 2 also functions as a supporting substrate of the liquid crystal display device 1, the thickness thereof is a thickness for which heat-radiation performance required as a heatsink can be obtained as well as rigidity required as a supporting substrate can be realized, and this is 8 mm, for example. When viewed from the front side, the shape of the heatsink 2 is a rectangular form. And, in the side surfaces of shorter sides of the heatsink 2, three screw holes 2a and two screw holes 2b are alternatively formed.

Moreover, on the rear side of the heatsink 2, a fin unit 3 is provided. The fin unit 3 is composed of a plate-like base member 3a and a plurality of fins 3b provided in an erect condition from the base member 3a toward the rear side. The fins 3b are arrayed in a matrix form on the rear surface of the base member 3a. The base member 3a is a plate-like form and the thickness thereof is, for example, 3 mm. In addition, the shape of the fins 3b is a strip form, and the height thereof is 30 through 40 mm, for example. The base member 3a of the fin unit 3 is connected to the heatsink 2 by a plurality of screws 21 (see FIG. 2). Thereby, the fin unit 3 is closely fitted to the heatsink 2. Still, in FIG. 1, illustration of the screws 21 has been omitted. In addition, for the heatsink 2 and fin unit 3, opening portions to allow insertion of wiring connected to a liquid crystal panel to be described later may be provided.

On the other hand, on the front side of the heatsink 2, two rear covers 4 are provided. The rear cover 4 has been divided into two, and a space therebetween is a gap 22. And, the two rear covers 4 are each composed of a bottom plate 4a and a side plate 4b which is extended to the front side from three sides of this rear plate 4a excluding a side opposed to the gap 22. In addition, on the rear surface of the bottom plate 4a, nuts 23 are fixed at positions matched with the screws 21. Into the nuts 23, the screws 21 are to be screwed. And, the screws 21 are screwed into the nuts 23 after being inserted through hole portions which have been formed, respectively, in the base member 3a of the fin unit 3 and heatsink 2. Thereby, the rear covers 4 are connected to the heatsink 2 with a distance equal to the height of the nuts 23 therebetween.

In addition, in the gap 22 between the rear covers 4, a plurality of light emitting diodes (LEDs) 5 are arrayed in line. For the light emitting diode 5, provided are a base member 5a and light-emitting portions 5b provided on the front surface of the base member 5a. The base member 5a is a plate-like member extending in the array direction of the light emitting diodes 5, which has been standaedized among all light emitting diodes 5. And, the base member 5a is contacted to the heatsink 2 by screws (unillustrated). Thereby, the base member 5a is closely fitted to the heatsink 2. In addition, of the plurality of light emitting diodes 5, some are red light emitting diodes to emit red light, some of the others are green light emitting diodes to emit green light, and the rests are blue light emitting diodes to emit blue light.

Furthermore, at the front side of the line formed of light emitting diodes 5, provided is a reflector 6 which outputs an incident light after bending the same in direction by 90°. The shape of the reflector 6 is in a form of a column divided into four, which extends in the array direction of the light emitting diodes 5, and the inner surface of whose curved part is a mirror surface. The reflector 6 is arranged at the gap 22 so as to have a light emitted from the light emitting diodes 5 to the front side made incident into the same and so as to emit this light toward a lateral side. Still, the position of the reflector 6 in the front and rear direction is further at the front side than the bottom plate 4a of the rear cover 4, and is a position which corresponds to the side plate 4b.

Still furthermore, at a position where a light emitted from the reflector 6 is made incident, a color-mixing light guide plate 7 is provided. The color-mixing light guide plate 7 is a transparent plate member, which is provided, inside one of the rear covers 4, parallel to the bottom plate 4a, and the reflector 6 is optically coupled with the color-mixing light guide plate 7. The color-mixing light guide plate 7 is for transmitting a light emitted from the reflector 6 to a lateral side and also for mixing respective color lights.

Still furthermore, in a view from the color-mixing light guide plate 7, at the side opposite the side where the reflector 6 is arranged, provided is a reflector 8 which emits an incident light after bending the same in the direction by 180°. The shape of the reflector 8 is a form of a column divided into two, which extends in the array direction of the light emitting diodes 5, and the inner surface of whose curved part is a mirror surface. The reflector 8 is arranged inside one of the rear covers 4 so as to make light which is emitted to the lateral side from the color-mixing light guide plate 7 incident into the same and so as to fold back and emit this light to a lateral side, and is optically coupled with the color-mixing light guide plate 7.

Still furthermore, at the front side of the color-mixing light guide plate 7, provided is an illuminating light guide plate 9 parallel to the color-mixing light guide plate 7. The illuminating light guide plate 9 is a transparent plate member, whose one end edge is optically coupled with the reflector 8, so that a light folded back by the reflector 8 is made incident into the same. On the rear surface of the illuminating light guide plate 9, a plurality of dots (unillustrated) have been formed, which uniformly emit light made incident from the reflector 8 toward the front side. In addition, between the color-mixing light guide plate 7 and illuminating light guide plate 9, a reflection sheet 10 is provided to prevent light leakage between both light guide plates.

Still furthermore, at the front side of the illuminating light guide plate 9, an optical sheet 11 is provided. In FIG. 1 through FIG. 3, the optical sheet 11 has been drawn as one sheet for the sake of convenience, however, in actuality, the optical sheet 11 is a lamination of three thin sheets. Namely, provided are, in order from the side of the illuminating light guide plate 9, a diffusing sheet, a light-condensing sheet, and a polarizing sheet. The diffusing sheet is provided by adhering a plurality of beads to a transparent sheet, and this is for diffusing an incident light. If this diffusing sheet is not provided, the dots of the illuminating light guide plate 9 appear in an image. In addition, the light-condensing sheet is provided by forming a prism-like unevenness on the surface of a transparent sheet, and this is for condensing a light diffused by the diffusing sheet to the front side. Furthermore, the polarizing sheet is for allowing a polarized light which is to be transmitted a polarizing sheet provided for a liquid crystal panel 13 to be described later to transmit and for reflecting a non-transmitting polarized light toward the rear side. Still, the optical sheet can be used in an optimal combination according to a required luminance and is, therefore, not necessarily composed of three sheets.

And, provided is a frame-like chassis 12 for housing the aforementioned color-mixing light guide plate 7, reflector 8, reflection sheet 10, illuminating light guide plate 9, and optical sheet 11. The chassis 12 is arranged inside the rear covers 4, and by the chassis 12 and rear covers 4, the color-mixing light guide plate 7, reflection sheet 10, illuminating light guide plate 9, and an optical sheet 11 are sandwiched.

In addition, at the front side of the optical sheet 11 and chassis 12, a liquid crystal panel 13 is provided. The liquid crystal panel 13 is a transmission color liquid crystal panel, which is provided by arranging a liquid crystal layer between two transparent substrates. In addition, on the surfaces of the two transparent substrates of the liquid crystal panel 13, polarizing sheets (unillustrated) are adhered, respectively. And, the front surface of a center portion of the liquid crystal panel 13 serves as a display surface of the liquid crystal display device 1. To the liquid crystal panel 13, a signal substrate (unillustrated) is connected, and to this signal substrate, wiring (unillustrated) to externally input electric power and an image signal is connected. Still, in a view from the front side, the outlines of the liquid crystal display panel 13, the optical sheet 11, the illuminating light guide plate 9, the reflection sheet 10, the heatsink 2, and the fin unit 3 are roughly equal to each other.

Furthermore, at the front side of the liquid crystal panel 13, a front cover 14 is provided. Thus, by the front cover 14 and the chassis 12, the liquid crystal panel 13 is sandwiched. For the front cover 14, provided is a frame-like front surface plate 14a, which covers circumferential portions of the front surface of the liquid crystal panel 13. Moreover, for the front cover 14, provided are four side plates 14b extending to the rear side from outer edge portions of the front surface plate 14a. Of these, two side plates 14b pass through the external lateral sides of the liquid crystal panel 13, the chassis 12, the optical sheet 11, the illuminating light guide plate 9, reflection sheet 10, color-mixing light guide plate 7, reflector 8, and rear cover 4 and reach the lateral sides of the light emitting diodes 5. The other two side plates 14b further pass through the lateral sides of the light emitting diodes 5 and reach the lateral sides of the shorter sides of the heatsink 2.

And, one of the two side plates 14b which have reached the lateral sides of this heatsink 2 is connected to the heatsink 2 by a screw 24 screwed into the screw hole 2b of the heatsink 2. The other one is connected to the heatsink 2 via a metal fitting 25 whose section is a laid U-shape. The metal fitting 25 is also connected to the heatsink 2 by a screw 24 screwed into the screw hole 2b. Still, in the two side plates 14b which have reached the lateral sides of the heatsink 2, at positions corresponding to the screw holes 2b of the heatsink 2, opening portions or notches (unillustrated) are formed. In addition, inside the front cover 14, the liquid crystal panel 13, chassis 12, optical sheet 11, illuminating light guide plate 9, reflection sheet 10, color-mixing light guide plate 7, reflector 8, rear covers 4, reflector 6, and light emitting diodes 5 are housed. Still, the metal fitting 25 is used when the signal substrate or the like (unillustrated) to drive the liquid crystal panel 13 is arranged between the heatsink 2 and side plate 14b of the front cover 14 and the heatsink 2 and front cover 14 cannot be directly connected by a screw. Accordingly, the metal fitting 25 is unnecessary if there is a structure to allow directly connecting the heatsink 2 and front cover 14 each other by a screw.

Still, the base member 3a of the fin unit 3, heatsink 2, bottom plate 4a of the rear cover 4, color-mixing light guide plate 7, reflection sheet 10, illuminating light guide plate 9, optical sheet 11, liquid crystal panel 13, and front surface plate 14a of the front cover 14 are arranged parallel to each other. And, the rear covers 4, chassis 12, and front cover 14 compose a holding member to hold the liquid crystal panel 13. The holding member is supported by the heatsink 2 and holds the display panel 13 so as to position the display panel 13 and the light emitting diodes 5 at a constant distance therebetween. The rear covers 4 and the front cover 14 also have a function as a cover of the display panel 13.

Still furthermore, as shown in FIG. 3, to the heatsink 2, by screws 26 screwed into the screw holes 2a, a set-side chassis 15 can be attached as an external chassis. The set-side chassis 15 covers part of the liquid crystal display device 1 to protect the liquid crystal display device 1 and also, by being attached to a set strut (unillustrated), supports the liquid crystal display device 1. In addition, in the set-side chassis 15, an air vent (unillustrated) to ventilate air is formed. Still, for the set-side chassis 15, a fan to supply the fin unit 3 with outside air may be provided. And, normally, in order to cover the liquid crystal display device 1, the set-side chassis 15 and a part of the set strut, an exterior housing (unillustrated) made of a resin or the like and excellent in external appearance is attached.

Next, operations of the liquid crystal display device 1 according to the present embodiment constructed as described above will be described. First, as a result of external input of electric power and an image signal into the liquid crystal display device 1, the liquid crystal panel 13 forms an image based on the image signal. On the other hand, the plurality of light emitting diodes 5, namely, red diodes, green diodes, and blue diodes respectively emit red, green, and blue lights toward the front side. These respective color lights are made incident into the reflector 6, and after being bent in their traveling direction by 90° by the reflector 6, these are emitted to the lateral side. These respective color lights emitted from the reflector 6 are made incident into the color-mixing light guide plate 7, are color-mixed while being transmitted to the lateral side inside the color-mixing light guide plate 7, and reach the reflector 8 as a white light. And, the white light is folded back by the reflector 8, that is, bent in its traveling direction by 180°, and is emitted to the lateral side. This light is made incident into the illuminating light guide plate 9, is scattered by the dots while being transmitted to the lateral side inside the illuminating light guide plate 9, and is almost uniformly emitted from the front surface of the illuminating light guide plate 9 toward the front side.

And, the light emitted from the front surface of the illuminating light guide plate 9 is diffused, condensed, and polarized by the optical sheet 11, and is made incident into the liquid crystal panel 13. At this time, at the polarizing sheet of the optical sheet 11, only a polarized light which can be made incident into the liquid crystal panel 13 passes therethrough. On the other hand, a polarized light which cannot be made incident into the liquid crystal panel 13 is reflected to the rear side by the polarizing sheet, and is reused. Namely, this light which has been reflected to the rear side is reflected by the illuminating light guide plate 9 or reflection sheet 10 to change into the polarizing direction, and is again made incident into the optical sheet 11. And, light passing through the optical sheet 11 passes through the liquid crystal panel 13, an image is added as a result, and this is emitted from the liquid crystal display device 1 toward the front side. Thereby, the image can be displayed.

At this time, owing to the operation of the light emitting diodes 5, the light emitting diodes 5 generate heat. This heat is transmitted to the heatsink 2, is transmitted from the heatsink 2 to the fin unit 3, and is released into the air from the fin 3b of the fin unit 3. Thereby, the light emitting diodes 5 are cooled.

Next, effects of the present embodiment will be described. In the liquid crystal display device 1 according to the present embodiment, since the red, green, and blue light emitting diodes 5 are used as a light source and lights emitted from these light emitting diodes are color-mixed and made incident into the liquid crystal panel, color reproducibility of a displayed image is excellent. Although using white diodes as light emitting diodes can also be considered, when white diodes are used, color reproducibility is lowered compared to that in a case where lights emitted from respective color light emitting diodes are mixed.

In addition, in the present embodiment, since the light emitting diodes 5 and fin unit 3 are closely contacted to the heatsink 2, it is possible to efficiently transmit heat generated at the light emitting diodes 5 to the heatsink 2, transmit the heat from the heatsink 2 to the fin unit 3, and release the heat from the fin unit 3 into the air. Thereby, a rise in temperature of the light emitting diodes 5 can be efficiently suppressed, which allows preventing the light emitting diodes 5 from thermal destruction and also allows maintaining luminous efficiency of the light emitting diodes 5 at a high value. And, the heatsink 2 is increased in size to make the size of the heatsink 2 viewed from the front side almost equal to the size of the liquid crystal panel 13 and thicken the thickness to 8 mm, for example. Thereby, heat radiation efficiency can be improved. As a result, a large number of diodes, which are high-luminance and high-calorific-value diodes can be mounted on the liquid crystal display device 1, thus image luminance can be improved.

Still, in a device construction similar to that of a conventional liquid crystal display device using cold cathode tubes for its light source, when only the heatsink is increased in size as in the present embodiment, since the mass of the heatsink becomes excessively great in comparison with the mass of the whole device, dynamic structure of the device becomes unstable. Therefore, in the present embodiment, the heatsink 2 is made to function also as a support substrate. Namely, the rear covers 4 and front cover 14 are connected to the heatsink 2 to make the same hold the liquid crystal panel 13 via the rear covers 4 and front cover 14. Thereby, the heatsink 2 increased in size can be efficiently utilized as a supporting substrate, and also the liquid crystal display device 1 never loses mass balance as a whole even when the heatsink 2 is increased in size, thus the display device is structurally stabilized.

In addition, in the present embodiment, the heatsink 2 is arranged parallel to the liquid crystal panel 13. Thereby, without increasing the liquid crystal display device 1 in size, the outline of the heatsink 2 can be increased to the same degree as that of the liquid crystal panel 13. As a result, heat-radiation performance is improved, and also the display panel 13 can be stably supported.

Furthermore, in the present embodiment, the set-side chassis 15 is to be connected to the heatsink 2. Thereby, since the set-side chassis 15 is to be directly connected to the heatsink 2, which is a supporting substrate inside the liquid crystal display device 1, the set-side chassis 15 can stably support the liquid crystal display device 1. Namely, when the mass of the heatsink 2 is increased to improve heat-radiation performance, the center of gravity of the liquid crystal display device 1 comes to be positioned within the heatsink 2, however, since the set-side chassis 15 is connected to this part of the center of gravity, the liquid crystal display device 1 can be stably held. In addition, the screw holes 2a have been provided in the side surfaces of the heatsink 2, and the set-side chassis 15 is fixed to the heatsink 2 by the screws 26 screwed into these screw holes 2a, therefore, it is unnecessary to provide a special connecting member in order to connect the heatsink 2 to the set-side chassis 15.

Still furthermore, since the heatsink 2 is made of aluminum, thermal conductivity of the heatsink 2 is high, and also the heatsink 2 is light by comparison with the volume. In addition, since the heatsink 2 has been shaped by a cutout method, surface flatness is high. Thereby, the base member 3a of the fin unit 3 and the base member 5a of the light emitting diodes 5 can be closely fitted to the heatsink 2, which can improve heat-radiation performance.

Still furthermore, in the present embodiment, the plurality of light emitting diodes 5 have been arrayed in line and the reflectors 6 and 8 have been provided, the color-mixing light guide plate 7 and illuminating light guide plate 9 can be arranged parallel to the liquid crystal panel 13. Thereby, a compact optical system for color-mixing and unifying lights emitted from the light emitting diodes 5 can be formed, which can make the liquid crystal display device 1 thin.

Still furthermore, since the reflection sheet 10 has been provided, when light is transmitted inside the color-mixing light guide plate 7 and inside the illuminating light guide plate 9, light leakage between both light guide plates can be prevented. Thereby, light utilization efficiency can be improved.

Figure 4:
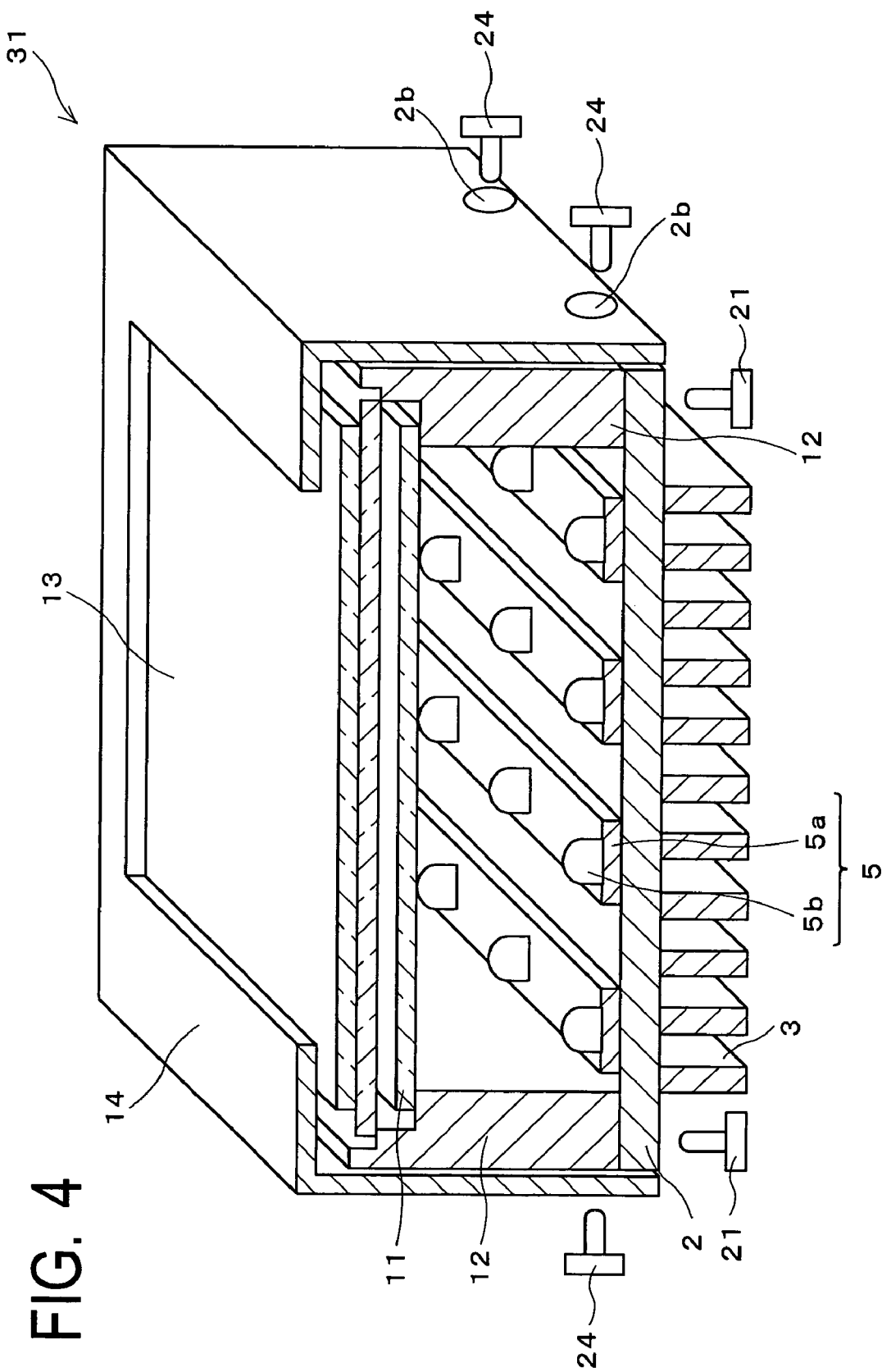
FIG. 4 is a sectional view showing a liquid crystal display device according to a second embodiment of the invention.

Next, a second embodiment of the present invention will be described. FIG. 4 is a sectional view showing a liquid crystal display device according to the present embodiment. As shown in FIG. 4, in a liquid crystal display device 31, on the front surface of a heatsink 2, that is, at a position opposed to the rear surface of a liquid crystal panel 13, a plurality of light emitting diodes 5 are arrayed in a matrix form, and are connected to the heatsink 2. Namely, common base members 5*a* are provided for the light emitting diodes 5 arrayed in line, and the base members 5*a* are connected and closely fitted to the heatsink 2 by screws 21 (see FIG. 2). And, lines of the light emitting diodes 5 which share the single base plate 5*a* are arranged in a plurality of lines parallel to each other. The light emitting diodes 5 are red diodes, green diodes, and blue diodes. In addition, light which has been emitted to the front side from the light emitting diodes 5 is to be directly made incident into a diffusion plate 16, and in comparison with the liquid crystal display device 1 (see FIG. 1) according to the aforementioned first embodiment, no reflectors 6 and 8, color-mixing light guide plate 7, reflection sheet 10, illuminating light guide plate 9, optical sheet 11, and rear covers 4 are provided. Still, an optical sheet 11 may be provided between the diffusion plate 16 and liquid crystal panel 13. Aspects of the construction of the present embodiment other than above are the same as those of the aforementioned first embodiment.

In the present embodiment, a light which has been emitted to the front side from the light emitting diodes 5 is directly made incident into the diffusion plate 16, passes through the diffusion plate 16 and liquid crystal panel 13, and is emitted outside. Therefore, in comparison with the aforementioned first embodiment, the reflectors 6 and 8, color-mixing light guide plate 7, reflection sheet 10, illuminating light guide plate 9, optical sheet 11, and rear covers 4 can be omitted. Nevertheless, in order to sufficiently color-mix lights emitted from the light emitting diodes 5, since it is necessary to sufficiently widely secure the distance between the light emitting diodes 5 and diffusion plate 16, in comparison with the aforementioned first embodiment, the effect to make the liquid crystal display device thin is small. Operations and effects of the present embodiment other than the above are the same as those of the aforementioned first embodiment.

Still, in the aforementioned first and second embodiments, although examples where the liquid crystal panel 13 is used as a display panel have been shown, the present invention is not limited hereto, and for example, it may be possible that a film on which a positive image has been formed, a screen for which an image has been printed on a transparent sheet or the like are used as a display panel so that the same can be arranged at the front side of the optical sheet. At this time, this display panel may be attachable and detachable with respect to other parts. Namely, a display device according to the present invention also includes a light box in the scope thereof.

In addition, in the aforementioned second embodiment, it may be possible to omit the optical sheet 11 and liquid crystal panel 13 and form pixels by the red, green, and blue light emitting diodes. Thereby, without diffusing lights emitted from the light emitting diodes, by controlling emission intensity of the respective light emitting diodes based on an image signal, an image can be directly formed.

Furthermore, in the aforementioned first and second embodiments, although examples where the heatsink is made of aluminum were described, the present invention is not limited hereto, it is sufficient that the heatsink is made of a material excellent in thermal conductivity, and the heatsink can be made of, for example, an aluminum alloy, copper or a copper alloy or the like.

The aforementioned first and second embodiments can be applied to a display device using light emitting diodes as a light source, and in particular, it can be appropriately applied to a professional-use monitor used for printing and photographic purposes.

What is claimed is:

1. A display device comprising:
    a light emitting diode;
    a display panel which displays an image by light emitted from said light emitting diode;
    a heatsink contacted to said light emitting diode, said heatsink having a surface being entirely parallel to a surface of said display panel;
    a holding member which is supported by said heatsink and holds said display panel so as to position said display panel and said light emitting diode at a constant distance therebetween; and
    an optical unit, wherein said light emitting diode is provided in a plurality of numbers, some of these plurality of light emitting diodes are red light emitting diodes to emit red light, some of the others are green light emitting diodes to emit green light, and the rests are blue light emitting diodes to emit blue light, and said optical unit is for mixing lights emitted from said red diodes, green diodes, and blue diodes and guiding the same to said display panel,
    wherein the plurality of light emitting diodes are arrayed in line, and said optical unit comprises:
    a color-mixing light guide plate for mixing light emitted from said red diodes, green diodes, and blue diodes;
    a reflector for folding back light emitted from said color-mixing light guide plate; and
    an illuminating light guide plate arranged between said color-mixing light guide plate and said display panel for emitting light made incident from said reflector to the whole surface of said display panel,
    wherein said holding member comprises:
    a front cover covering peripheral portions of said display panel;
    a chassis for sandwiching said display panel between said chassis and said front cover and housing said illuminating light guide plate and said color-mixing light guide plate; and
    a rear cover for sandwiching said illuminating light guide plate and said color-mixing light guide plate between said rear cover and said chassis, and said front cover and said rear cover are connected to said heatsink.

2. The display device according to claim 1, wherein said heatsink is made of aluminum or an aluminum alloy.

3. The display device according to claim 1, further comprising a fin attached to said heatsink.

4. The display device according to claim 3, wherein said light emitting diode transfers heat to the fin via said heatsink.

5. The display device according to claim 1, wherein said display panel is a transmission color liquid crystal panel.

6. The display device according to claim 1, wherein said heatsink is arranged parallel to said display panel.

7. The display device according to claim 1, wherein a portion for connecting said side plate and said heatsink is also used for connecting to an external chassis.

8. The display device according to claim 7, wherein said part is a screw hole provided at side surface of said heatsink, said heatsink is fixed to said external chassis by screwing a screw of said external chassis into the screw hole.

* * * * *